(12) United States Patent
Brandner

(10) Patent No.: US 6,826,876 B2
(45) Date of Patent: Dec. 7, 2004

(54) GLASS PANE WITH PLASTIC BORDERING

(75) Inventor: Hans Brandner, Dachau (DE)

(73) Assignee: BBG GmbH & Co. KG (DE)

( * ) Notice: Subject to any disclaimer, the term of this patent is extended or adjusted under 35 U.S.C. 154(b) by 0 days.

(21) Appl. No.: 09/827,416

(22) Filed: Apr. 6, 2001

(65) Prior Publication Data

US 2002/0022115 A1 Feb. 21, 2002

(30) Foreign Application Priority Data

Apr. 7, 2000 (DE) .................................... 200 06 330 U

(51) Int. Cl.[7] .............................................. E06B 7/00
(52) U.S. Cl. .............................. 52/204.597; 52/204.62; 52/717.01; 52/208; 296/201; 296/146.15
(58) Field of Search ..................... 52/204.597, 204.62, 52/208, 204.1, 591.1, 597, 717.01; 296/93, 208, 201, 146, 15, 146.15, 96.21

(56) References Cited

U.S. PATENT DOCUMENTS

| 3,338,015 | A | * | 8/1967 | Hoverman | 52/204.597 |
|---|---|---|---|---|---|
| 5,163,731 | A | * | 11/1992 | Gold | 296/201 |
| 5,478,132 | A | * | 12/1995 | Gold | 296/146.15 |
| 5,529,366 | A | * | 6/1996 | Gold | 296/96.21 |
| 5,538,314 | A | * | 7/1996 | Young et al. | 296/146.15 |
| 5,794,372 | A | * | 8/1998 | Grana | 40/729 |
| 6,203,639 | B1 | * | 3/2001 | Swanson et al. | 156/108 |
| 6,241,306 | B1 | * | 6/2001 | Adorni et al. | 296/146.15 |
| 6,263,627 | B1 | * | 7/2001 | Schonenbach et al. | 52/208 |
| 6,375,254 | B1 | * | 4/2002 | Patz | 296/216.09 |

FOREIGN PATENT DOCUMENTS

| DE | 0166414 | * | 6/1985 | E06B/3/62 |
|---|---|---|---|---|
| DE | 3536806 | * | 10/1985 | B60J/1/00 |
| JP | 5-58157 | * | 3/1993 | B60J/1/00 |

* cited by examiner

Primary Examiner—Carl D. Friedman
Assistant Examiner—Chi Q. Nguyen
(74) Attorney, Agent, or Firm—Knobbe Martens Olson & Bear LLP

(57) ABSTRACT

A glass pane with plastic bordering for fixed side and rear windows as well as moonroofs of a vehicle. The glass pane comprises a groove formed in the plastic bordering adapted to receive a resilient sealing profile. The plastic bordering with the sealing profile press fit in the groove is adapted to secure the glass pane within a chassis of a vehicle as well as provide weather sealing. The contour of the plastic bordering is adapted to accurately locate and self-center the glass pane within a receiving chassis.

8 Claims, 1 Drawing Sheet

GLASS PANE WITH PLASTIC BORDERING

RELATED APPLICATION

This application claims of German Application No. 200 06 330.8 filed 7 Apr. 2000 entitled "Glasscheibe mit Kunststoff-Umrandung".

BACKGROUND OF THE INVENTION

1. Field of the Invention

The invention relates to a glass pane with a plastic bordering, in particular with a frame which is foamed around and made of polyurethane (PU) foam, and an edge seal with a generally tear-shaped sealing profile.

2. Description of the Related Art

Such glass panes with a plastic bordering are inserted in the construction of vehicles as fixed panes, and side windows in particular, into the vehicle chassis by way of screw bolts. An edge seal is provided so that humidity or water cannot enter the interior of the vehicle. As a result, a sealing profile is usually glued onto the inner side of the glass pane which, during insertion, is then pressed into the vehicle chassis by means of screw bolts against a sealing contour which is fixedly attached to the vehicle. In the case of side windows, the chassis is usually slightly bent inwardly, so that the side pane is substantially flush with the flank of the chassis in the inserted state.

A further possibility for fastening panes to the vehicle chassis is gluing. The glue is used simultaneously for fixing and sealing purposes. This procedure is generally used for windshields and rear windows, but also for fixed glazings in the vehicle roof.

The disadvantage in the latter procedure is the fact that the gluing surface must be pre-treated in the glass pane that is foamed or injection-molded around in order to achieve clean gluing. Moreover, the application of the glue is laborious, because a precise dosage and positioning of the glue spread (glue bead) is required. Moreover, it is necessary to fix the glass pane until the glue has set, which slows down the assembly flow in the production plant. As a result, the costs for gluing panes in this way are relatively high.

In the first alternative as mentioned above with the inserted screw bolts and a sealing profile it is also disadvantageous in that the gluing surface on the plastic-bordered glass pane needs to be pre-treated. Moreover, it is necessary to remove a protective layer which protects the glue film prior to the gluing, which also leads to more work. As a result, the overall costs are relatively high in this case too, since this gluing sealing profile is generally a specially made product and is therefore relatively expensive.

SUMMARY OF THE INVENTION

As a result, the invention is based on the object of providing a glass pane with a plastic bordering which avoids the aforementioned disadvantages and in particular helps to achieve a simple and cost-effective assembly.

This object is achieved by a glass pane with a plastic bordering according to the features of claim 1. Preferable embodiments are the subject matter of the subclaims.

In the proposed glass pane with a plastic bordering, a groove is arranged which is aligned substantially perpendicular to the main surface of the glass pane, is undercut, and into which the sealing profile can be pressed. The undercut groove is preferably injection-molded or foamed on the plastic bordering in one molding process. The plastic bordering is simultaneously configured in such a way that the same forms a stop or positioning surface for insertion into the vehicle. The glass pane is pulled against the same during screwing down or gluing in, thus achieving a precise positioning. Moreover, the sealing profile pressed into the undercut groove comes to rest against the chassis, so that proper sealing is achieved.

As compared with the previously known sealing profile to be glued on, the sealing profile as proposed herein for pressing into the groove can be obtained with a round cross section as inexpensive standard or piece goods. Mounting per se can be performed more simply and quickly than the gluing on of the sealing profile. Notice should be taken that by pressing the sealing profile into the undercut groove, a projecting drop-like sealing lip is formed, thus producing a particularly effective sealing effect.

DETAILED DESCRIPTION OF THE PREFERRED EMBODIMENT

Figure 1:
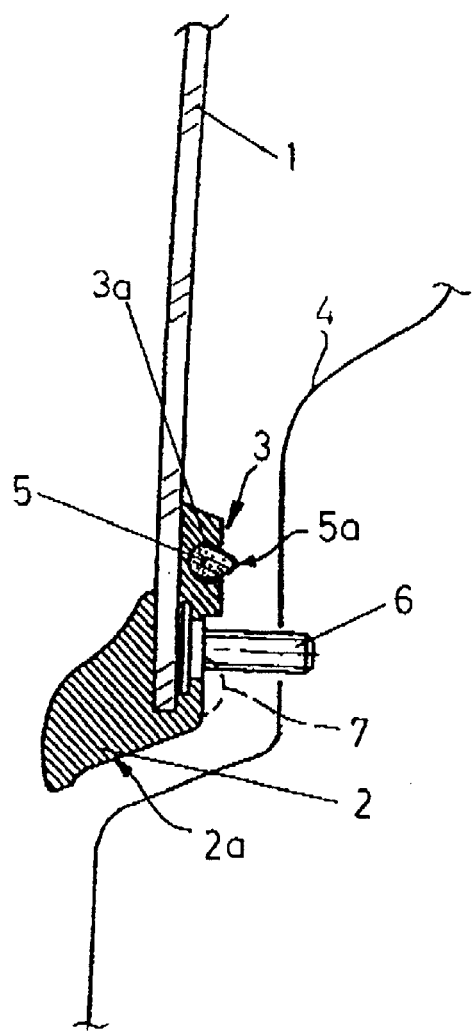

An embodiment of the invention is now explained in closer detail by reference to the enclosed drawings, wherein FIG. 1 shows a glass pane 1 in a cross-sectional view, as is inserted as a side window in a vehicle. The glass pane 1 is provided with a plastic bordering 2 which is provided with an edge seal 3. Said edge seal 3 faces towards the interior of the vehicle. An undercut groove 3a is formed in the edge seal 3 which is thus also aligned substantially perpendicular to the main surface of glass pane 1, i.e. also towards the interior of the vehicle. The glass pane 1 can be inserted and secured into a chassis 4 of the vehicle by means of the plastic bordering 2 and the edge seal 3. The chassis 4 is provided with a slightly stepped arrangement, so that the glass pane 1 is substantially flush with the chassis 4 in the assembled state.

Figure 2:
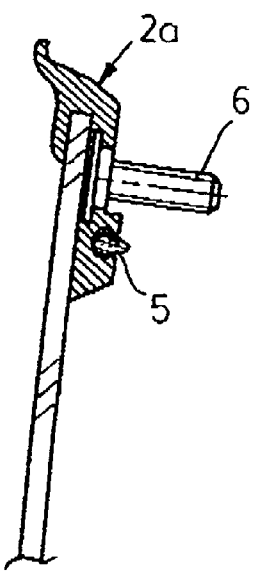
FIG. 1 shows a glass pane with a plastic bordering in a cross sectional view and FIG. 2 shows an enlarged perspective view of a glass pane with a plastic bordering during the insertion process of the sealing profile.
Figure 2:
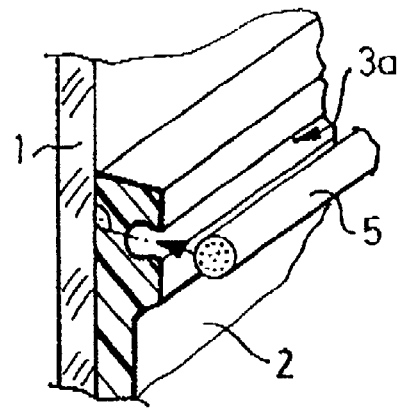

As is also shown in FIG. 2, a simple sealing profile 5 with a circular cross section can be pressed into the undercut groove 3a, with the cross section of the groove 3a being smaller than the cross section of the sealing profile 5. After "snapping into" groove 3a, a projecting sealing lip 5a is obtained whose cross section is tear-shaped (cf. FIG. 1). A particularly precise sealing is thus achieved.

Several insert screws 6 are molded into the plastic bordering 2, which is made in particular of PU foam, with which the glass pane 1 can be securely anchored in the chassis 4. Instead of said insert screws 6 it is also possible to provide a gluing in the form of a bead 7 of glue, as is indicated with the broken lines. Notice should be taken that in both cases a precise positioning within the chassis 4 of the vehicle occurs during the assembly by the bevel or conical external shape 2a of the plastic bordering. In conclusion, a simple and cost-effective assembly of the glass pane 1 for use as a fixed pane (side window, rear window, moon-roof, etc.) is achieved by simply pressing in or snapping in the sealing profile 5 which, in one embodiment, comprises a relatively soft cellular rubber.

What is claimed is:

1. A glass pane assembly comprising:
a glass pane defining a major plane;

a plastic bordering which is foamed around the glass pane with polyurethane foam;

an edge seal having a generally circular cross-section in an uninstalled state and defining a generally tear-shaped sealing lip in an installed state wherein an undercut groove is formed in the plastic bordering wherein the undercut groove is aligned substantially perpendicular to the major plane of the glass pane and wherein the undercut groove is adapted to receive the edge seal so as to form the sealing lip via press-fit and such that the sealing lip extends substantially perpendicular to the major plane of the glass pane and wherein the plastic bordering is arranged as a stop surface against a chassis and wherein the stop surface defines a substantially conical profile abutting the chassis; and a plurality of insert screws wherein the insert screws are foamed into the plastic bordering.

2. The glass pane assembly of claim 1, wherein the cross section of the groove is smaller than the cross section of the sealing profile such that, when the sealing profile is pressed into the groove, a projecting sealing lip is formed.

3. The glass pane assembly of claim 1, wherein the sealing profile comprises rubber.

4. The glass pane assembly of claim 3, wherein the rubber comprises cellular rubber.

5. The glass pane assembly of claim 1, wherein the sealing profile is disposed circumferentially around the glass pane.

6. The glass pane assembly of claim 1, wherein the plastic bordering is glued into the chassis via a bead of glue.

7. The glass pane assembly of claim 6, wherein the bead of glue and the sealing profile are arranged substantially parallel with respect to each other.

8. The glass pane assembly of claim 1, wherein the groove is produced in one molding pass by foaming the plastic bordering around the pane.

* * * * *